(12) United States Patent
Moritz

(10) Patent No.: US 11,084,218 B2
(45) Date of Patent: Aug. 10, 2021

(54) APPARATUS FOR ADDITIVELY MANUFACTURING THREE-DIMENSIONAL OBJECTS

(71) Applicant: CONCEPT LASER GMBH, Lichtenfels (DE)

(72) Inventor: Bernhard Moritz, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 176 days.

(21) Appl. No.: 16/294,501

(22) Filed: Mar. 6, 2019

(65) Prior Publication Data

US 2020/0122397 A1    Apr. 23, 2020

(30) Foreign Application Priority Data

Oct. 18, 2018 (EP) .................................. 18201349

(51) Int. Cl.
*B29C 64/371*    (2017.01)
*B29C 64/153*    (2017.01)
(Continued)

(52) U.S. Cl.
CPC .......... *B29C 64/371* (2017.08); *B22F 3/1007* (2013.01); *B22F 10/20* (2021.01); *B29C 64/153* (2017.08); *B22F 10/30* (2021.01); *B22F 2201/11* (2013.01); *B29C 64/268* (2017.08); *B33Y 10/00* (2014.12); *B33Y 30/00* (2014.12); *B33Y 40/00* (2014.12)

(58) Field of Classification Search
CPC ... B29C 64/371; B29C 64/153; B29C 64/268; B22F 3/1007; B22F 3/1055; B22F 2003/1057; B22F 2201/11

USPC .............................. 264/85; 475/375; 425/375
See application file for complete search history.

(56) References Cited

U.S. PATENT DOCUMENTS

2016/0136731 A1 * 5/2016 McMurtry ............ B29C 64/153
                                                                  419/53
2020/0094320 A1 * 3/2020 Krol ...................... B29C 64/277

FOREIGN PATENT DOCUMENTS

DE  102010052206 A1 * 5/2012 ............. B33Y 40/00
DE  102010052206 A1    5/2012
WO  WO2014199150 A1  12/2014

OTHER PUBLICATIONS

Machine translation of Herzog (DE102010052206A1) May 10, 2012 (Year: 2012).*

(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Apparatus (1) for additively manufacturing three-dimensional objects (2) by means of successive layerwise selective consolidation of layers of a build material (3) which can be consolidated by means of an energy source (4), which apparatus (1) comprises a stream generating device (6) adapted to generate a gas stream (7) in a process chamber (8) of the apparatus (1) and an application device (18) comprising an application unit (19) with an application element (20) that is moveable across a build plane (14) of the apparatus (1) for applying build material (3) in the build plane (14), wherein the application device (18) comprises at least one stream guiding unit (22) that is adapted to guide the gas stream (7) along a streaming path (26).

22 Claims, 3 Drawing Sheets

Figure 1:
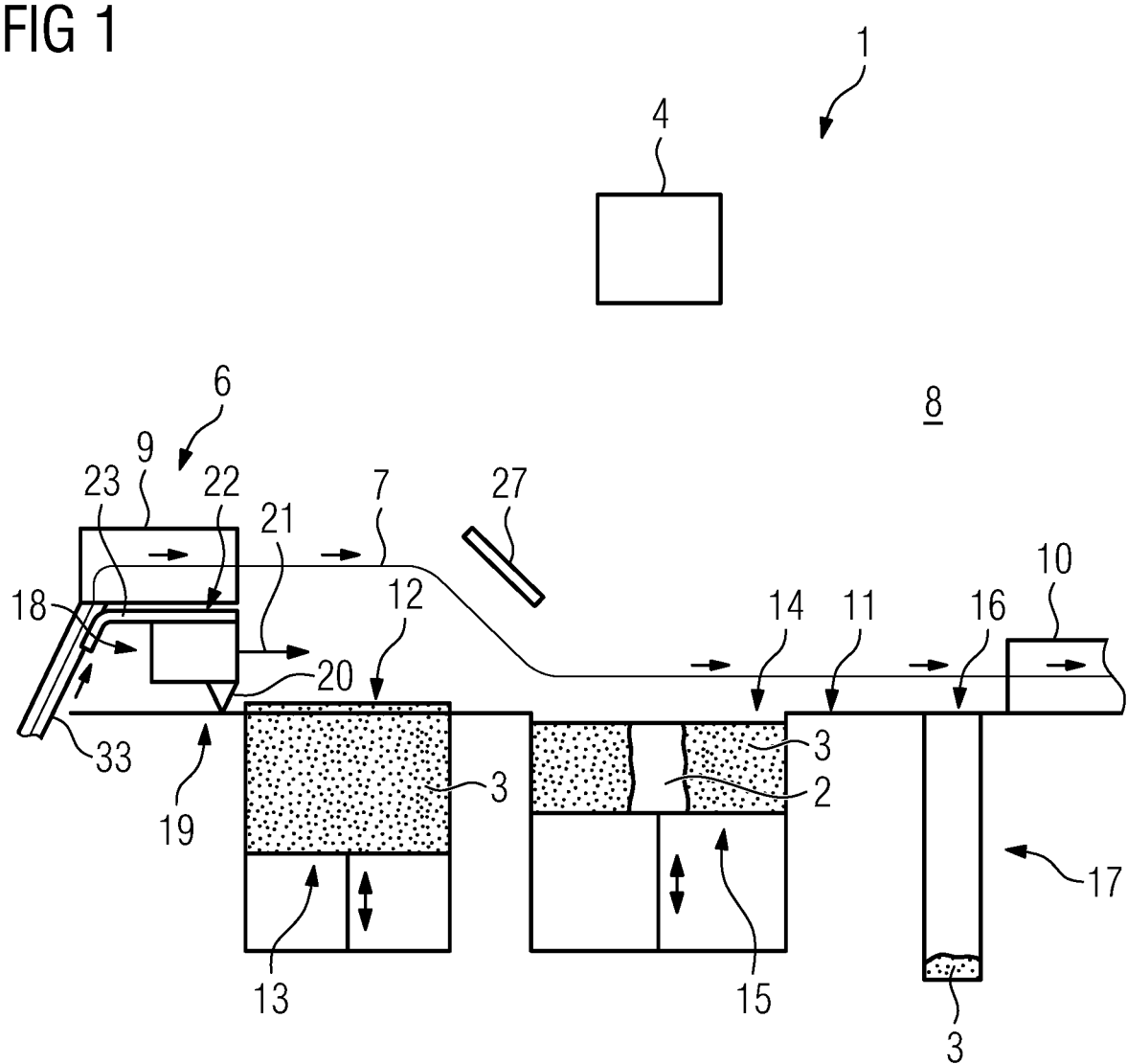

(51) Int. Cl.
*B22F 3/10*    (2006.01)
*B22F 10/20*   (2021.01)
*B33Y 10/00*   (2015.01)
*B33Y 30/00*   (2015.01)
*B33Y 40/00*   (2020.01)
*B29C 64/268*  (2017.01)
*B22F 10/30*   (2021.01)

(56) References Cited

OTHER PUBLICATIONS

European Search Report Corresponding to EP18201349 dated Apr. 26, 2019.

* cited by examiner

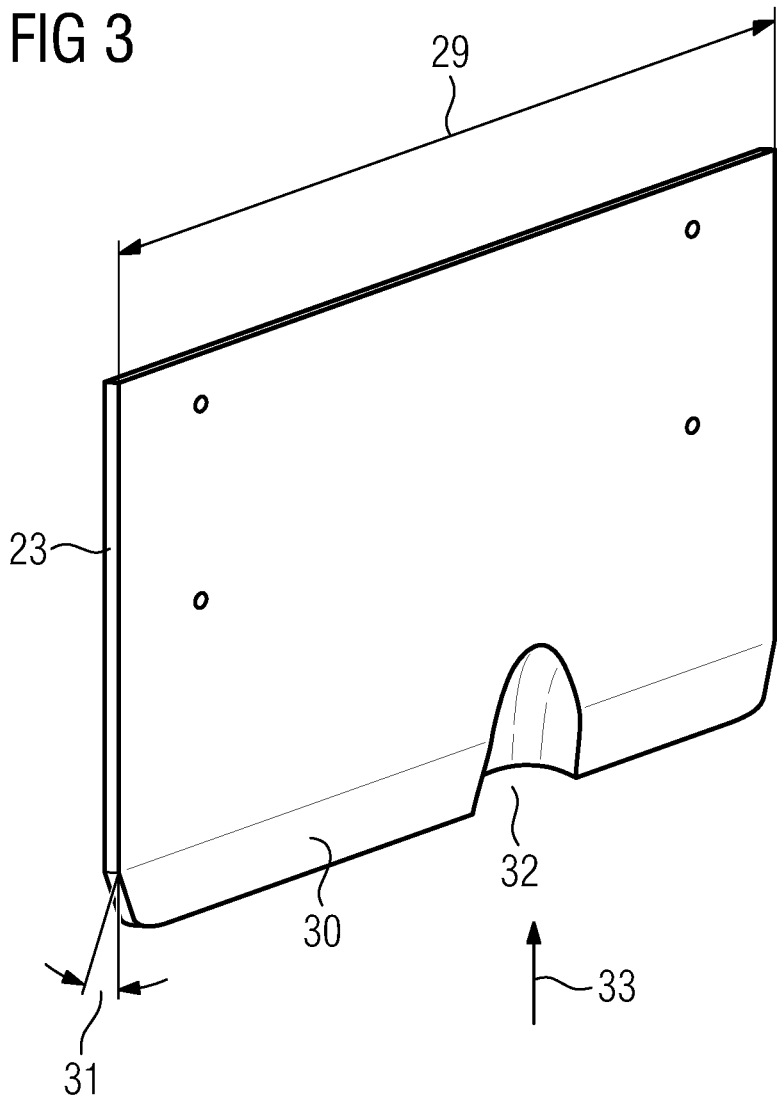

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 201 349.0 filed Oct. 18, 2018, the contents of which is incorporated herein by reference in its entirety as if set forth verbatim.

DESCRIPTION

The invention relates to an apparatus for additively manufacturing three-dimensional objects by means of successive layerwise selective consolidation of layers of a build material which can be consolidated by means of an energy source, which apparatus comprises a stream generating device adapted to generate a gas stream in a process chamber of the apparatus and an application device comprising an application unit with an application element that is moveable across a build plane of the apparatus for applying build material in the build plane.

Apparatuses for additively manufacturing three-dimensional objects in which build material is successively layerwise consolidated in a build plane in a process chamber, wherein a gas stream is generated streaming through the process chamber via a stream generating device of the apparatus are generally known from prior art. In typical apparatuses, build material is applied via an application device comprising an application unit, such as a carrier for carrying an application element, e.g. a re-coater blade or a rake, that can be moved across the build plane. Usually, the gas stream is used to provide a defined (inert) atmosphere in the process chamber under which the build material can be consolidated, e.g. upon selective irradiation with an energy beam or another energy source. The gas stream can further be charged with residues to convey the residues out of the process chamber, such as soot, smoke or smolder or stirred up non-consolidated build material particles.

Further, it is known from prior art that the control of different parameters of the gas stream is difficult and often a compromise has to be made, as for removing residues from the process chamber the streaming velocity or the flow rate of the gas stream, respectively, should be chosen as high as possible. However, if the streaming velocity or the flow rate of the gas stream is chosen too high, additional build material can be stirred up and build material provided in a dose plane or a build plane in the process chamber can be blown (or sucked) away in that the build material layer provided in the respective plane is uneven and not properly distributed anymore. In the worst-case, the unevenly distributed build material can lead to a termination of the additive manufacturing process, as build material cannot be conveyed via the application device anymore. On the other hand, the flow rate or the streaming velocity of the gas stream cannot be chosen too low, as residues generated in the additive manufacturing process cannot be properly removed from the process chamber and therefore, may negatively influence the process quality or the object quality, for instance.

It is an object of the present invention to provide an improved apparatus for additively manufacturing three-dimensional objects, in particular improved with respect to the gas stream used in the additive manufacturing process.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam. A respective build material can be a metal, ceramic or polymer powder. A respective energy beam can be a laser beam. A respective apparatus can be an apparatus in which an application of build material and a consolidation of build material is performed separately, such as a selective laser sintering apparatus or a selective laser melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, as described before, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the application device comprises at least one stream guiding unit that is adapted to guide the gas stream along a streaming path. Hence, the gas stream that streams through the process chamber can be guided via the at least one stream guiding unit that is provided via the application device, wherein the gas stream can be guided along a defined streaming path through the process chamber. The gas stream that streams along the defined streaming path can specifically be guided to regions of the process chamber in which the gas stream is needed, e.g. in regions in which the gas stream has to be charged with residues or in which the gas stream has to provide an inert atmosphere.

The application device that comprises the stream guiding unit therefore, is used for guiding the gas stream through the process chamber, wherein the stream guiding unit can be integrated or mounted to the application device (e.g. on top of a housing or a base body of an application unit), for instance. Hence, the stream guiding unit may be coupled via a mounting surface to a corresponding mounting surface of the application unit. The stream guiding unit may be considered a blade or spoiler for guiding the gas stream. Wth the stream guiding unit provided by the application device it is possible to prevent the gas stream from streaming in regions in which the gas stream can blow away build material or otherwise negatively affect the additive manufacturing process. For example, the stream guiding unit can be adapted to guide the gas stream along the streaming path in which the gas stream does not stream over build material arranged in a dose plane, for instance. Thus, it is possible to control different parameters of the gas stream more efficiently, for example using a higher flow rate or a higher streaming velocity compared with additive manufacturing apparatuses known from prior art, as the risk of blowing away (or sucking away) build material due to a too high streaming velocity of the gas stream, is reduced or even avoided due to the stream guiding unit that guides the gas stream along the streaming path in which the gas stream is not guided across a dose plane, for instance.

For guiding the gas stream along the defined streaming path, the stream guiding unit preferably comprises at least one stream guiding element that is arranged on the application unit, in particular on top of the application unit, extending against a streaming direction of the gas stream. Hence, the stream guiding unit may comprise a stream guiding element, such as a stream guiding blade or the like, which can be arranged on the application unit. Hence, as the application unit can be moved through the process chamber, e.g. across a dose plane and/or across the build plane, the stream guiding element may be moved together with the application unit through the process chamber. The stream guiding element is preferably arranged in that the stream guiding element extends from the application unit against the streaming direction of the gas stream, e.g. towards a gas inlet of the process chamber. The gas inlet may refer to an opening or orifice via which the gas stream can be guided into the process chamber. Process gas may further be introduced into the process chamber via a separate process gas intake, e.g. for inertizing the process chamber.

The term "application unit" may refer to any arbitrary structure of the application device on which the application element may be mounted or that can carry an application element, which application element may be built as a re-coater blade or a rake or the like, wherein the application unit can be built as base body or application element carrier structure, e.g. as housing at least partially surrounding the application element. In particular the application element can be mounted to the application unit and moved together with the application unit through the process chamber. It is particularly preferred that the stream guiding element is formed as a plate or top cover of the application unit and therefore, is mounted on top of the application unit. Besides, the stream guiding element may also be integrated into the application unit. Of course, it is also possible that the stream guiding element is directly mounted on the application element, e.g. on top of the application element.

Since the stream guiding element extends against the streaming direction of the gas stream, the gas stream can be guided via the stream guiding element over the application unit. Thus, the gas stream is guided along the defined streaming path and therefore, it can be avoided that the gas stream streams in regions of the process chamber in which the gas stream negatively influences the additive manufacturing process. For example, it is avoided that the gas stream is incident on an edge of the application unit, where the gas stream is deflected and guided to a dose plane in which build material is arranged. Instead, the gas stream is properly guided over the application unit to an intended/desired region of the process chamber, e.g. a part of the build plane in which the gas stream can be charged with residues, for instance.

The stream guiding element or the at least one stream guiding element may preferably extend over the width of the application unit. Therefore, the gas stream that is generated to stream through the process chamber can be guided along the entire width of the application unit therefore, allowing for the entire gas stream to stream over the width of the application unit and therefore, over the width of the dose plane or the build plane, i.e. the width of a process plane.

The at least one stream guiding element may further comprise at least one stream guiding section that is arranged under an angle relative to the streaming direction, in particular under −10°-−50°, preferably −30°. The term "angle relative to the streaming direction" in this embodiment refers to a defined streaming direction that streams essentially horizontally from a gas inlet through the process chamber. Of course, the angle can also be defined with respect to a horizontal plane, e.g. with respect to a dose plane or a build plane or a process plane of the apparatus. By having a stream guiding section that extends under −10°-−50°, preferably −30°, the stream guiding section of the stream guiding element extends "downwards" with respect to the process plane, e.g. with respect to the streaming direction of the gas stream. Therefore, it is possible to properly guide the gas stream that streams over the stream guiding element and further allow for moving the application unit beneath the gas inlet, e.g. beneath a flow box through which the gas stream is streamed into the process chamber.

According to another embodiment of the inventive apparatus, the stream guiding unit may be adapted to guide the gas stream along the streaming path extending from at least one gas inlet over the stream guiding element across the build plane to at least one gas outlet. Thus, the stream generating device is adapted to generate the gas stream streaming between the gas inlet and the gas outlet, e.g. arranged on opposite sides of the process chamber. The gas inlet can further be referred to or can be built as "flow box", e.g. as housing with a plurality of holes facing in streaming direction through which the gas stream can stream into the process chamber. With the stream guiding element in a proper position, e.g. the stream guiding unit properly positioned, the gas stream can be guided via the stream guiding element across the stream guiding element to the build plane and across the build plane to the at least one gas outlet. Of course, it is possible to have multiple gas inlets and multiple gas outlets between which at least one gas stream streams through the process chamber or a plurality of sub-gas streams, for instance.

The inventive apparatus may further be improved in that the stream guiding element may bridge at least one part of the dose plane, preferably the entire dose plane. As described before, dependent on the position of the application unit, the at least one stream guiding element that extends away from the application unit against streaming direction may "bridge" a part of the dose plane. The gas stream that is guided via the stream guiding element is therefore, not guided to that part of the dose plane or may not stream to that part of the dose plane, but is guided via the stream guiding unit over the stream guiding unit. In other words, the stream guiding element "shields" the part of the dose plane or "separates" the dose plane from the gas stream. It is particularly preferred that the stream guiding element may bridge the entire dose plane in that the gas stream does not stream across the entire dose plane therefore, avoid a stirring up of build material that is provided in the dose plane. Dependent on the geometry of the process chamber/build chamber, a gap can be left between the stream guiding element and the gas inlet, e.g. a 40 mm gap over a 200 mm build plane.

According to another preferred embodiment, the application device may be adapted to move the at least one application unit in a streaming position in which the gas stream is guided along the streaming path dependent on at least one process step of the additive manufacturing process, in particular in an irradiation step. In other words, dependent on the process step, e.g. the process step that is currently performed or that is to be performed next, the application unit may be positioned in a streaming position, e.g. moved into a streaming position. Wth the application unit in the streaming position, the stream guiding element that is mounted to the application unit, as described before, is adapted to guide the gas stream along the streaming path.

For example, if an irradiation step in which build material is selectively irradiated is to be performed next during the additive manufacturing process, the application unit may be moved to the streaming position in which the stream guiding element is adapted to guide the gas stream along the defined streaming path, in particular adapted to bridge the at least one part of the dose plane. Thus, it is possible to move the application unit and the stream guiding element that is connected with the application unit to a specific position in which the dose plane can be bridged allowing for avoiding negative influences on the additive manufacturing process, e.g. avoiding blowing away of build material.

Further, the stream generating device may be adapted to control at least one parameter of the gas stream, in particular a streaming velocity and/or a flow rate of the gas stream dependent on the position of the stream guiding element, in particular with the stream guiding element in the streaming position. Hence, it is possible that the stream generating device may control at least one parameter of the gas stream. The stream generating device may control different parameters of the gas stream, such as streaming velocity and/or a flow rate of the gas stream. The control of the at least one parameter of the gas stream is performed dependent on the position of the stream guiding element. As described before, the stream guiding element may be moved together with the application unit across the process plane, i.e. through the process chamber.

Dependent on the current position of the stream guiding element, it is possible to control the at least one parameter of the gas stream for adapting the gas stream to the current situation of the additive manufacturing process. As described before, it is possible to position the at least one stream guiding element dependent on a process step of the additive manufacturing process, wherein it is also possible to control the at least one parameter of the gas stream dependent on that position of the stream guiding element in which the stream guiding element is positioned dependent on the current process step of the additive manufacturing process.

It is particularly preferred that the stream generating device is adapted to increase the at least one parameter of the gas stream, in particular the streaming velocity and/or the flow rate, in the streaming position, in particular above a threshold value, preferably to a maximum value. In other words, if the stream guiding element is positioned in the streaming position, in which the stream guiding element preferably bridges at least one part of the dose plane, the stream generating device may be used to increase the at least one parameter of the gas stream. Therefore, it is possible that the flow rate or the streaming velocity of the gas stream can be increased in the situation in which the dose plane is bridged via the stream guiding element. Therefore, the gas stream cannot negatively affect the build material arranged in the dose plane, as the dose plane is bridged or "shielded" via the stream guiding element. The gas stream is guided via the stream guiding element or is guided over the stream guiding element, respectively.

For example, if the next irradiation step is to be performed, the application device may move the application unit to the streaming position in which the stream guiding element is adapted to guide the gas stream over the stream guiding element and therefore, bridge the at least one part of the dose plane. As the application unit is arranged or positioned in the streaming position, the stream generating device may increase the streaming velocity of the gas stream allowing for an improved removal of residues generated due to the irradiation of build material in the build plane.

Thus, the stream guiding unit advantageously allows for significantly increasing the flow rate or the streaming velocity of the gas stream, in particular to a maximum value, which is usually not possible, as the gas stream streaming with such a high velocity would negatively influence build material provided in a dose plane, for instance. It is particularly preferred that the stream generating device increases the at least one parameter of the gas stream in this situation above the threshold value, e.g. a value above which a proper removal of residues generated in the additive manufacturing process is assured. Of course, the threshold value may depend on the specific irradiation process step, e.g. dependent on at least one irradiation parameter, such as the amount of irradiated build material or the area of build material that needs to be irradiated, the scan speed, the spot size, the energy or the intensity of the energy beam and the like.

According to another embodiment of the inventive apparatus, the stream generating device may be adapted to reduce the at least one parameter of the gas stream, in particular the streaming velocity and/or the flow rate of the gas stream, preferably during or in advance to an application step. Hence, after the irradiation step is finished, the at least one parameter of the gas stream may again be reduced, e.g. the streaming velocity of the gas stream may be reduced to allow for the application unit being moved to apply build material in the build plane.

Thus, the application unit may be moved across the dose plane to pick up fresh build material and apply the build material in the build plane, while the stream generating device generates a gas stream with a reduced streaming velocity and/or a reduced flow rate, preferably reduced compared to a maximum value or the threshold value, as described before, in particular reduced compared to the at least one irradiation process step. As the stream guiding element is mounted on the application unit, the stream guiding element is moved together with the application unit during the application step in which build material is applied in the build plane. Of course, it is possible to reduce the at least one parameter of the gas stream during an application step or, which is particularly preferred, in advance to an application step, in that the gas stream does not negatively influence the build material arranged in the dose plane with the stream guiding element being moved out of the streaming position.

The inventive apparatus may further be improved in that the application device may be adapted to move the application unit, in particular the application element, between a starting position and an end position, wherein the application unit, in particular the stream guiding element, is at least partially positioned beneath the gas inlet, in particular a flow box, in the starting position. For example, it is possible to have different modules in the additive manufacturing process, e.g. arranged in a process plane, preferably a dose module providing build material in a dose plane, a build module adapted to provide a build plane in which build material can be received/applied to be selectively consolidated and an overflow module in which surplus or excess build material can be deposited. Therefore, the application unit is moved during an application process step from a starting position that is arranged next to the dose plane in that the application element can be moved across the dose plane to pick up the fresh build material and convey the fresh build material to the build plane. In the build plane, the build material is distributed via the application element, wherein excess or surplus build material is conveyed and deposited in the overflow module.

Preferably, the application unit is at least partially arranged beneath the gas inlet in the starting position, which gas inlet is preferably built as "flow box", e.g. a housing with at least one opening facing in streaming direction of the gas stream, in particular a plurality of openings allowing the gas stream to stream into the process chamber. The streaming position in which the stream guiding element bridges ("shields") the at least one part of the dose plane, preferably the entire dose plane, is preferably arranged between the edge of the dose plane facing the gas inlet and an edge of the build plane facing the gas inlet. Therefore, it is possible that the gas stream that enters the process chamber via the at least one gas inlet cannot pass downwards to the dose plane, but is incident on the stream guiding element and guided via the stream guiding element over the stream guiding element (and the application unit) towards the build plane. Therefore, turbulences or swirls generated by the gas stream being incident on an edge of the application unit can be avoided.

The stream guiding element may further comprise at least one gap segment, in particular a channel-shaped segment, wherein at least one pipe or channel providing the gas stream to the gas inlet is at least partially received in the gap segment in the starting position. Thus, with the application unit in the starting position, in which the application unit is at least partially positioned beneath the gas inlet, the gap segment of the stream guiding element at least partially receives or surrounds the pipe or the channel that provides the gas stream to the gas inlet. In other words, the gas stream streams through a pipe or a channel towards and into the gas inlet from where it is streamed into the process chamber. The gap segment of the stream guiding element allows for positioning the application unit and the stream guiding element beneath the gas inlet, e.g. for starting an application process step. By providing the stream guiding element with the gap segment, it is possible to move the application unit closer to the pipe or further under the gas inlet allowing for a reduction of a required installation space, in particular a reduction of the overall size of the apparatus. Hence, a collision of the stream guiding element with the pipe or channel can be avoided.

The inventive apparatus may further comprise an additional stream guiding element which can be arranged in succession (with respect to a streaming direction) to the stream guiding element in streaming position and adapted to guide the gas stream long a defined second streaming path across the build plane. In other words, an additional stream guiding element may be provided which can be arranged in succession to the stream guiding element being arranged in the streaming position. Thus, the gas stream can enter the process chamber through the at least one gas inlet, as described before, from where it is guided via the stream guiding element that is arranged in the streaming position towards the build plane. From the stream guiding element, the gas stream is at least partially incident on the at least one additional stream guiding element which is adapted to guide the gas stream along a defined second streaming path. Guiding the gas stream along the defined second streaming path allows for guiding the gas stream in a defined way or streaming pattern over the build plane, e.g. to a region of the build plane in which the gas stream is needed.

Preferably, the additional stream guiding element is fixed in position and arranged under an angle/inclined with respect to a horizontal plane, such as a process plane, the dose plane or the build plane of the apparatus. The additional stream guiding element may preferably be built as a blade that guides the gas stream that is provided and guided via the stream guiding element onto the build plane in a defined manner. The additional stream guiding element may be built from metal, but any arbitrary material can be used as long it is suitable to resist the conditions in the process chamber, such as heat.

Besides, the invention relates to an application device for applying build material in a build plane of an apparatus for additively manufacturing three-dimensional objects by means of successive layerwise selective irradiation and consolidation of layers of a build material which can be consolidated by means of an energy source, in particular an inventive apparatus, as described before, wherein the application device comprises at least one stream guiding unit that is adapted to guide the gas stream along a streaming path.

Further, the invention relates to a method for operating an apparatus for additively manufacturing three-dimensional objects by means of successive layerwise selective irradiation and consolidation of layers of a build material which can be consolidated by means of an energy source, which apparatus comprises a stream generating device adapted to generate a gas stream in a process chamber of the apparatus and an application device with an application element that is moveable across a build plane of the apparatus for applying build material in the build plane, wherein the gas stream is guided along a streaming path via at least one stream guiding element of the application device.

Of course, all features, details and advantages described with respect to the inventive apparatus are fully transferable to the inventive application device and the inventive method and vice versa. Preferably, the inventive method may be performed on the inventive apparatus, in particular using an inventive application device.

According to a preferred embodiment of the inventive method, it is possible to move the application unit with the at least one application element which is mounted on the application unit of the application device to a streaming position, in particular in advance to an irradiation process step. In the streaming position, the stream guiding element at least partially shields the dose plane, wherein preferably the entire dose plane is shielded via the stream guiding element. Thus, the gas stream entering the process chamber is guided via the stream guiding element and therefore, cannot pass the stream guiding element to be incident on build material provided in the dose plane, for instance. With the stream guiding element being arranged in the streaming position, it is possible that at least one parameter of the gas stream is changed, i.e. controlled, e.g. increased. For example, the streaming velocity of the gas stream can be increased above the threshold value, in particular to a maximum value in that residues that are generated in the irradiation process step that can properly be removed from the process chamber.

After the irradiation process step is finished and another layer of build material has to be applied via the application unit, the at least one parameter of the gas stream can be changed, for example again be reduced to an initial value or any other arbitrary value that allows for guiding the gas stream through the process chamber without negatively influencing build material arranged in the dose plane or the build plane, e.g. without blowing away build material. After the at least one parameter of the gas stream has been reduced, the application unit can be moved from the streaming position to the starting position of the application process, in particular next to the dose plane beneath the gas inlet. From the starting position the application unit can be moved across the dose plane to pick up fresh build material provided in the dose plane and convey the build material to the build plane where the build material can be distributed via the application element. Excess or surplus build material can be deposited in an overflow module arranged next to the build plane on the side facing a gas outlet.

Of course, the at least one irradiation step and application step, as described before, can be (alternatingly) repeated until the object is successively layerwise manufactured.

Figure 2:
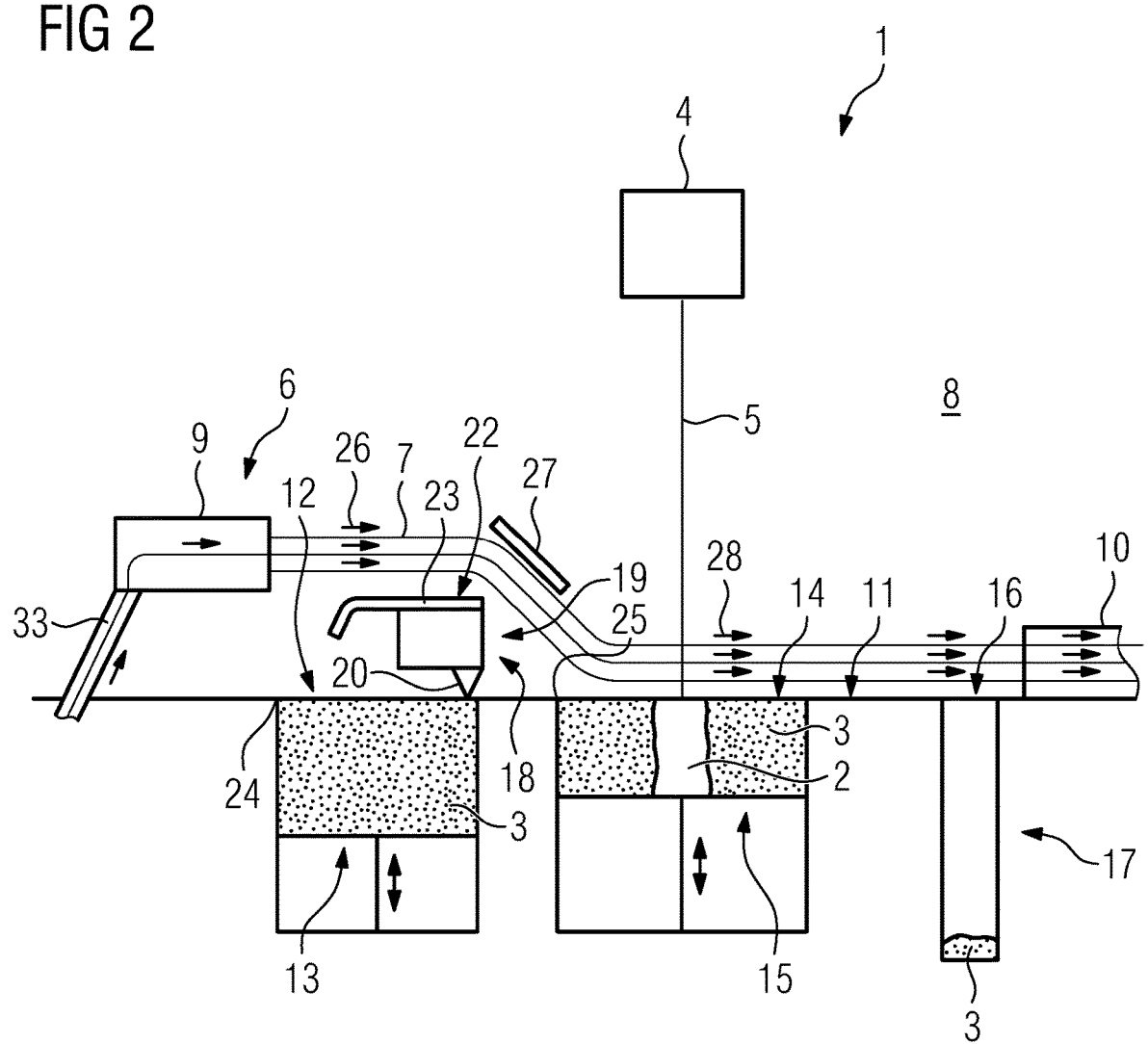

Exemplary embodiments of the invention are described with reference to the Fig. The Fig. are schematic diagrams, wherein FIG. 1 shows an inventive apparatus in a first process step;

FIG. 2 shows the inventive apparatus from FIG. 1 in a second process step; and FIG. 3 shows a stream guiding element of the inventive apparatus from FIGS. 1, 2.

FIG. 1 shows an apparatus 1 for additively manufacturing three-dimensional objects 2 by means of successive layerwise selective consolidation of layers of a build material 3, e.g. by means of an energy source 4 such as a laser source adapted to generate an energy beam 5, e.g. a laser beam. The apparatus 1 comprises a stream generating device 6 that is adapted to generate a gas stream 7 in a process chamber 8 of the apparatus 1. The gas stream 7 streams from a gas inlet 9 towards a gas outlet 10, wherein the gas inlet 9 and the gas outlet 10 are to be understood as merely exemplary and any other arbitrary arrangement of the gas inlet 9 and the gas outlet 10 is feasible. In particular, it is also possible that a plurality of gas inlets 9 and/or gas outlets 10 is provided.

The gas stream 7, as depicted in FIG. 1, can stream across a process plane 11, e.g. a plane in which the additive manufacturing process is performed. In this exemplary embodiment the process plane 11 comprises a dose plane 12 provided via a dose module 13, a build plane 14 provided via a build module 15 and an overflow 16 provided via an overflow module 17. Residues that are generated in the additive manufacturing process, e.g. via an irradiation of build material 3 via the energy beam 5 can be transported out of the process chamber 8 via the gas stream 7.

The apparatus 1 further comprises an application device 18 that is adapted to pick up build material 3 from the dose plane 12 and move the build material 3 from the dose plane 12 to the build plane 14 and distribute the build material 3 in the build plane 14. Excess build material 3 that cannot be distributed in the build plane 14 can be conveyed to the overflow 16. In the situation that is depicted in FIG. 1, the application device 18, in particular an application unit 19 comprising an application element 20 is arranged in a starting position in which the application unit 19 can be moved in application direction 21 across the process plane 11 to apply a layer of build material 3 in the build plane 14. In this situation the stream generating device 6 is adapted to control at least one parameter of the gas stream 7, in particular the flow rate and/or the streaming velocity of the gas stream 7 and set the at least one parameter to an initial value. Hence, the gas stream 7 is streamed through the process chamber 8 with a first streaming velocity and/or a first flow rate.

The first streaming velocity/first flow rate may be adjusted to meet a minimum value or it is even possible to completely shut off the gas stream 7 in the initial state.

The first velocity and/or the first flow rate are chosen in that build material 3 that is provided in the dose plane 12 is not negatively influenced via the gas stream 7, in particular build material 3 provided in the dose plane 12 is not blown away with the gas stream 7. As residues are predominantly generated during an irradiation of build material 3, during an application of build material 3 no residues or only a minor amount of residues is generated. Thus, the first velocity and/or the first flow rate may be reduced compared to a maximum value with which the gas stream 7 can be streamed through the process chamber 8.

The application device 18 is adapted to move the application unit 19 to a so-called streaming position that is depicted in FIG. 2. The stream guiding unit 22 comprises a stream guiding element 23 that extends away from the application unit 19 against streaming direction 33 (in this example from left to right, cf. FIG. 3) of the gas stream 7. In other words, the stream guiding element 23 extends from the application unit 19 towards the gas inlet 9. The streaming position can be chosen in that the application element 20 or the application unit 19 is arranged between an edge 24 of the dose plane 12 facing the gas inlet 9 and an edge 25 of the build plane 14 facing the gas inlet 9, in particular between the dose module 13 and the build module 15 with respect to the application direction 21, for instance. Preferably, the application element 20 is positioned in the region between the dose plane 12 and the build plane 14.

As can further be derived from FIG. 2, the application element 23 guides the gas stream 7 along a defined streaming path 26 through the process chamber 8 between the gas inlet 9 and the gas outlet 10. In particular, the stream guiding element 23 bridges the dose plane 12 in that the gas stream 7 cannot negatively influence build material 3 arranged in the dose plane 12. Therefore, the stream guiding element 23 shields the dose plane 12 by guiding the gas stream 7 over the stream guiding element 23 and therefore, away from the dose plane 12. Thus, the stream guiding element 23 allows for a change of the at least one parameter of the gas stream 7 via the stream generating device 6 in that the streaming velocity and/or the flow rate of the gas stream 7 can significantly be increased, in particular above a defined threshold value, preferably to a maximum streaming velocity and/or a maximum flow rate of the gas stream 7.

Therefore, in advance to an irradiation step in which build material 3 is irradiated via the energy beam 5 in the build plane 14, the application device 18 can position the application unit 19 and therefore, move the applicationunit 19 to the streaming position, wherein the stream guiding element 23 is positioned in the streaming position that is depicted in FIG. 2, and the stream generating device 6 can increase the at least one parameter of the gas stream 7. Thus, while build material 3 is irradiated via the energy beam 5, the gas stream 7 can be streamed faster and with a higher flow rate compared to the application step that is depicted in FIG. 1. Thus, residues generated during the irradiation of build material 3 can be removed from the process chamber 8 more efficiently resulting in an improved quality of the three-dimensional object 2, wherein an adhesion/deposition of residues on the object 2 can be avoided.

The apparatus 1 further comprises an additional stream guiding element 27, wherein the additional stream guiding element 27 is arranged between the dose plane 12 and the build plane 14 in this exemplary embodiment. Of course, the additional stream guiding element 27 is arranged above the process plane 11 dependent on the height above the process plane 11 in which the stream generating 6 device generates the gas stream 7. The gas stream 7 is deflected via the additional stream guiding element 27 in that the gas stream 7 can be guided across the build plane 14 along a defined second streaming path 28 which is preferably streamed closely over the build plane 14.

Therefore, it is possible to use a maximum streaming velocity and/or a maximum flow rate of the gas stream 7 during the irradiation of build material 3 and thereby, remove a maximum of residues that are generated during the irradiation of build material 3. During an application process in which build material 3 is applied in the build plane 14, the at least one parameter of the gas stream 7 can again be reduced to ensure that a negative impact on the application process, such as swirling up of build material 3 or blowing away of build material 3 can be reduced or even avoided entirely.

FIG. 3 shows a perspective view on the application element 23 that is mounted on top of the application unit 19 in the situations depicted in FIGS. 1, 2. The stream guiding element 23 extends over a width 29 that matches the width of the application unit 19. The stream guiding element 23 further comprises a stream guiding section 30 that extends under an angle 31 relative to the process plane 11, e.g. −10°−−15°. Further, the stream guiding element 23 comprises a gap segment 32, wherein the gap segment 32 partially surrounds a pipe 33 via which the gas stream 7 is fed to the gas inlet 9, as depicted in FIGS. 1, 2. Hence, it is possible to arrange the application unit 19 beneath the gas inlet 9, e.g. built as a flow box, in the starting position. This allows for reducing the size of the apparatus 1, as the process chamber 8 can be reduced.

Of course, the control of the at least one parameter of the gas stream 7 and/or the control of the movement of the application device 18, in particular the movements of the application unit 19 can also be controlled via at least one separate control unit (not shown). Self-evidently, the inventive method may be performed on the inventive apparatus 1, preferably using an inventive application device 18.

The invention claimed is:

1. A method of additively manufacturing a three-dimensional object, the method comprising:
generating, with a stream generating device, a gas stream in a process chamber of an apparatus for additively manufacturing three-dimensional objects, the gas stream flowing across the process chamber from a gas inlet located at a first side of the process chamber to a gas outlet located at a second side of the process chamber opposite to the first side of the process chamber, and the process chamber comprising a process plane, the process plane comprising a dose plane and a build plane adjacent to the dose plane; and
performing, with an application device comprising a recoater element and a stream guiding element, an application process comprising moving the application device across the process plane to distribute powder build material from the dose plane upon the build plane with the recoater element;
wherein the stream guiding element is configured to guide the gas stream laterally across and past the stream guiding element when the application device moves across the process plane and as the gas stream flows from the gas inlet to the gas outlet.

2. The method of claim 1, wherein the stream guiding element is arranged on top of the application device, and wherein the stream guiding element extends away from the application device in a direction opposite to a streaming direction of the gas stream.

3. The method of claim 1, comprising:
moving the application device to a streaming position, the streaming position corresponding to the recoater element being located between an upstream edge of the dose plane and an upstream edge of the build plane, wherein the stream guiding element extends across at least a portion of the dose plane when the application device has moved to the streaming position.

4. The method of claim 3, wherein the apparatus comprises an energy source configured to perform an irradiation process comprising irradiating the build plane with an energy beam, and wherein the method comprises:
moving the application device to the streaming position in advance of the energy source performing the irradiation process.

5. The method of claim 3, comprising:
controlling, with the stream generating device, at least one parameter of the gas stream based at least in part on a position of the application device and/or based at least in part on whether the application device is in the streaming position, the at least one parameter of the gas stream comprising a streaming velocity and/or a flow rate.

6. The method of claim 5, comprising:
increasing the at least one parameter of the gas stream above a threshold value when the application device is in the streaming position; and/or
decreasing the at least one parameter of the gas stream below a threshold value in advance of or during the application device performing the application process.

7. The method of claim 1, wherein the apparatus comprises a flow box, and wherein the flow box defines the gas inlet, and wherein the method comprises:
moving the application device between a starting position and an end position, wherein the starting position comprises the stream guiding element being at least partially positioned beneath the flow box.

8. An apparatus for additively manufacturing three-dimensional objects, the apparatus comprising:
a process chamber comprising a process plane, the process plane comprising a dose plane and a build plane adjacent to the dose plane; and
a stream generating device configured to generate a gas stream in the process chamber, the gas stream flowing across the process chamber from a gas inlet located at a first side of the process chamber to a gas outlet located at a second side of the process chamber opposite to the first side of the process chamber; and
an application device comprising a recoater element and a stream guiding element;
wherein the application device is configured to perform an application process comprising moving across the process plane to distribute powder build material from the dose plane upon the build plane with the recoater element, and wherein the stream guiding element is configured to guide the gas stream laterally across and past the application device with the application device being at a location along the process plane between the gas inlet and the gas outlet.

9. The apparatus of claim 8, wherein the stream guiding element is arranged on top of the application device, and wherein the stream guiding element extends away from the application device in a direction opposite to a streaming direction of the gas stream.

10. The apparatus of claim 8, wherein the stream guiding element has a width selected to match a width of the application device.

11. The apparatus of claim 8, wherein the stream guiding element comprises a stream guiding section, the stream guiding section having an angle relative to a streaming direction of from negative 10 degrees to negative 20 degrees.

12. The apparatus of claim 8, wherein the stream guiding element extends across at least a portion of the dose plane when the application device has moved to a streaming position, the streaming position corresponding to the recoater element being located between an upstream edge of the dose plane and an upstream edge of the build plane.

13. The apparatus of claim 12, wherein the streaming position corresponds to the recoater element being located between the dose plane and the build plane.

14. The apparatus of claim 12, wherein the apparatus comprises an energy source configured to perform an irradiation process comprising irradiating the build plane with an energy beam, and wherein the application device is configured to move to the streaming position in advance of the energy source performing the irradiation process.

15. The apparatus of claim 12, wherein the stream generating device is configured to control at least one parameter of the gas stream, based at least in part on a position of the application device, the at least one parameter of the gas stream comprising a streaming velocity and/or a flow rate.

16. The apparatus of claim 12, wherein the stream generating device is configured to control at least one parameter of the gas stream based at least in part on whether the application device is in the streaming position.

17. The apparatus of claim 16, wherein the stream generating device is configured to increase the at least one parameter of the gas stream above a threshold value when the application device is in the streaming position.

18. The apparatus of claim 15, wherein the stream generating device is configured to decrease the at least one parameter of the gas stream below a threshold value in advance of or during the application device performing the application process.

19. The apparatus of claim 8, wherein the application device is configured to move between a starting position and an end position, wherein the starting position comprises the stream guiding element being at least partially positioned beneath the gas inlet.

20. The apparatus of claim 19, wherein the apparatus comprises a flow box, and wherein the flow box defines the gas inlet, and wherein the starting position comprises the stream guiding element being at least partially positioned beneath the flow box.

21. The apparatus of claim 17, wherein the apparatus comprises a gas supply pipe configured to supply the gas stream to the gas inlet, and wherein the stream guiding element comprises a channel-shaped recess corresponding to a profile of at least a portion of the gas supply pipe, and wherein the channel-shaped recess is configured to receive the at least a portion of the gas supply pipe when the application device moves to the starting position.

22. The apparatus of claim 12, comprising:
an additional stream guiding element arranged in succession to the stream guiding element relative to the application device when located at the streaming position, the additional stream guiding element configured to guide the gas stream towards and across the build plane.

* * * * *